United States Patent [19]

Washizuka et al.

[11] Patent Number: 4,875,036

[45] Date of Patent: Oct. 17, 1989

[54] LIQUID CRYSTAL DISPLAY DEVICE FOR BOTH INPUTTING AND OUTPUTTING INFORMATION

[75] Inventors: Isamu Washizuka, Kyoto; Yukihiro Inoue, Kashihara; Yoshio Okajima, Nara, all of Japan

[73] Assignee: Sharp Kabushiki Kaisha, Osaka, Japan

[21] Appl. No.: 185,281

[22] Filed: Apr. 18, 1988

Related U.S. Application Data

[63] Continuation of Ser. No. 778,006, Sep. 20, 1985, abandoned.

[30] Foreign Application Priority Data

Sep. 22, 1984 [JP] Japan .................................. 59-199291

[51] Int. Cl.[4] .............................................. G09G 3/36
[52] U.S. Cl. ...................................... 340/784; 340/712;
340/767; 340/805; 178/18
[58] Field of Search ............... 340/784, 712, 794, 765,
340/793, 706, 767, 719, 805; 178/18; 350/332, 333; 358/236

[56] References Cited

U.S. PATENT DOCUMENTS

| | | |
|---|---|---|
| 3,956,745 | 5/1976 | Ellis ...................................... 340/765 |
| 4,110,967 | 9/1978 | Fujita .................................... 350/332 |
| 4,477,877 | 10/1984 | Nakamura et al. .................... 178/18 |
| 4,485,376 | 11/1984 | Noble .................................... 340/784 |
| 4,567,481 | 1/1986 | Meier et al. .......................... 340/784 |
| 4,573,766 | 3/1986 | Bournay, Jr. et al. ............... 340/716 |
| 4,604,617 | 8/1986 | Morozumi ............................ 340/784 |
| 4,630,122 | 12/1986 | Morokawa ............................ 340/784 |
| 4,679,043 | 7/1987 | Morokawa ............................ 340/784 |

FOREIGN PATENT DOCUMENTS

WO85/03374  8/1985  PCT Int'l Appl. ................. 340/712

Primary Examiner—David K. Moore
Assistant Examiner—M. Fatahiyar
Attorney, Agent, or Firm—Birch, Stewart, Kolasch & Birch

[57] ABSTRACT

The disclosed is an input and liquid crystal display unit including a flat liquid crystal display unit allowing input of data by manual writing having a plurality of partial display areas which are divisible into multiple units. The display unit overlays a magnetic tablet for inputting the designated data into the unit for display on the partial display areas. The display is driven to only some of said partial display areas to display the input pattern in the information on the partial display areas by applying a high duty cycle scan voltage to the common electrodes of the partial display areas.

10 Claims, 3 Drawing Sheets

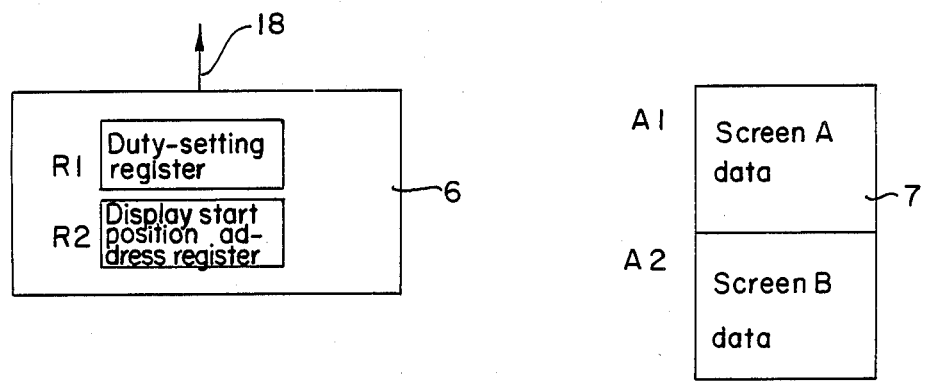
FIG. 5
FIG. 6
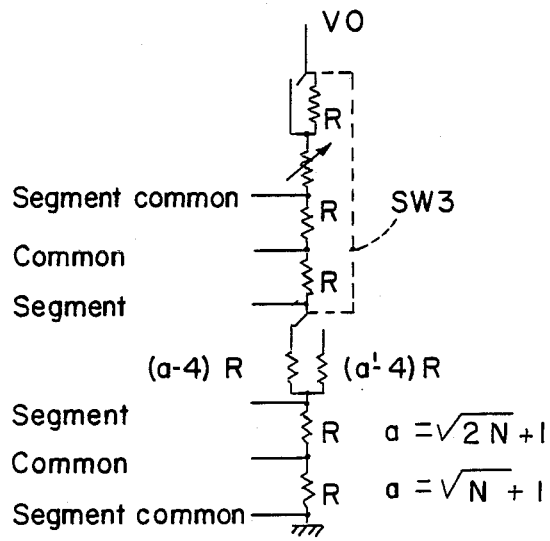
$a = \sqrt{2N} + 1$
$a = \sqrt{N} + 1$
FIG. 7
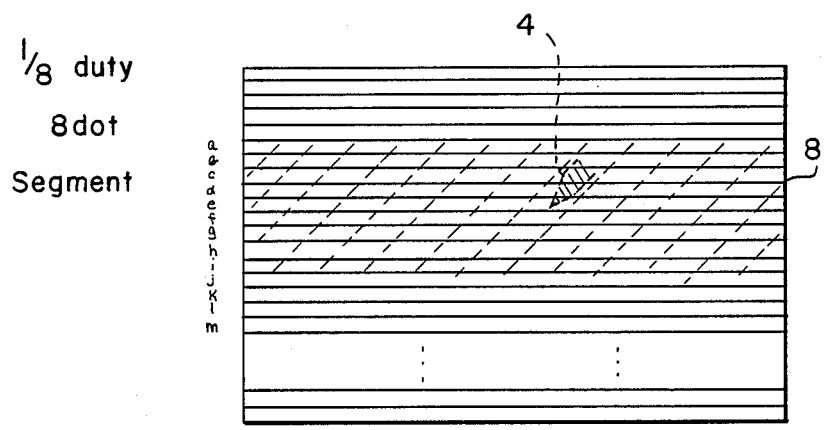
1/8 duty
8 dot
Segment
FIG. 8

LIQUID CRYSTAL DISPLAY DEVICE FOR BOTH INPUTTING AND OUTPUTTING INFORMATION

This application is a continuation of application Ser. No. 778,006 filed on Sept. 20, 1985, now abandoned.

BACKGROUND OF THE INVENTION

The present invention relates to a device consisting of a liquid crystal display with an electromagnetic input tablet which allows the operator to display characters, figures, and symbols (henceforth referred to as an input pattern) by writing manually on a tablet using magnetic stylus. The device is capable of executing both the input and liquid crystal display of the input pattern including characters, figures, or symbols written by hand. The manual input pattern can be stored in screen memory and can be retrieved in a sequence, synchronous with the scanning operation of the liquid crystal display unit, before it is displayed on the screen.

Conventional large-screen liquid crystal display units are unable to display input information in sharp contrast because they employ a relatively low duty ratio. Due to their inability to show sufficient contrast in a pattern written manually, conventional units are generally unsatisfactory to users. Poor input and display discrimination imposes a heavy burden on the operator and results in inefficient operation.

SUMMARY OF THE INVENTION

The present invention aims at solving the technical problems described above by providing a device capable of generating sharper contrast by raising the duty factor of the designated input area, thus not scanning the display in the area which is not manually input. As a result, the performance and efficiency of the input operation is drastically improved.

Other objects and further applications of the present invention will become apparent from the detailed description given hereafter. It should be understood, however, that the detailed description and specific examples, while indicating the preferred embodiments of the invention, are given by way of illustration only, since various changes and modifications within the spirit and scope of the invention will become apparent to those skilled in the art from this detailed description.

Briefly speaking, the present invention relates to a useful device executing both the input and liquid crystal display operations comprising: a flat liquid crystal display unit that allows input of data written manually by a magnetic stylus; the display area of said liquid crystal display device being divided into a plurality of partial display areas; the means for inputting data into the tablet on said partial display area via the liquid crystal display unit; and the means for allowing display of input pattern in said partial display area being operable with a high duty factor.

BRIEF DESCRIPTION OF THE DRAWINGS

The present invention will be better understood from the detailed description given below and the accompanying drawings which are given by way of illustration only, and thus do not limit the present invention in which:

FIG. 5 is a configuration of control circuit 6;

FIG. 6 is a configuration of exclusive screen memory 7;

FIG. 7 is a simplified diagram of the circuit compensating for ON-voltage of liquid crystal display unit 3;

FIG. 8 is a chart explaining the manual input operation.

DETAILED DESCRIPTION OF THE PREFERRED EMBODIMENTS

Figure 1:
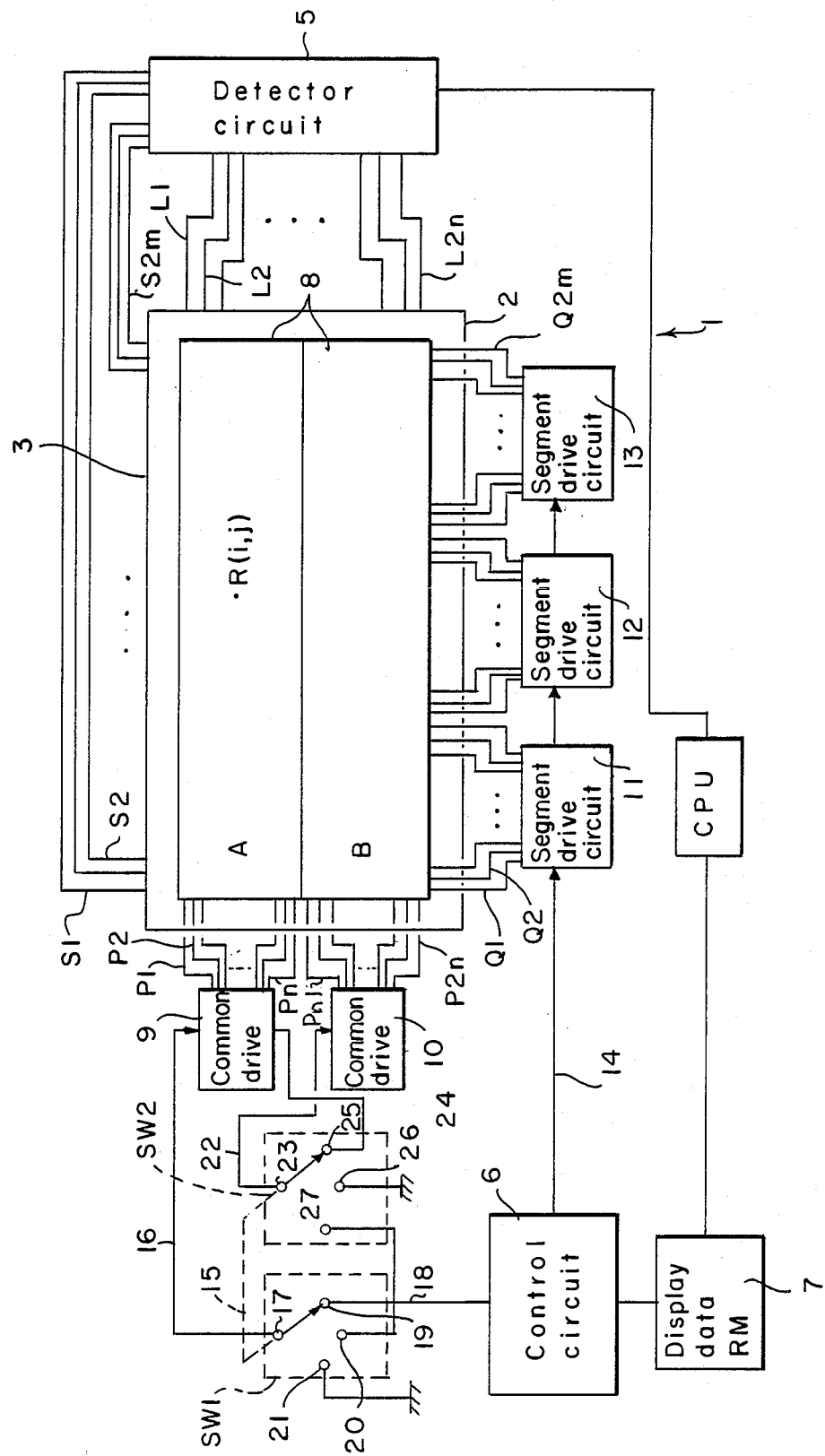
FIG. 1 is a simplified block diagram of device 1, which includes both the input and liquid crystal displays incorporated in the preferred embodiment of the present invention.
Figure 2:
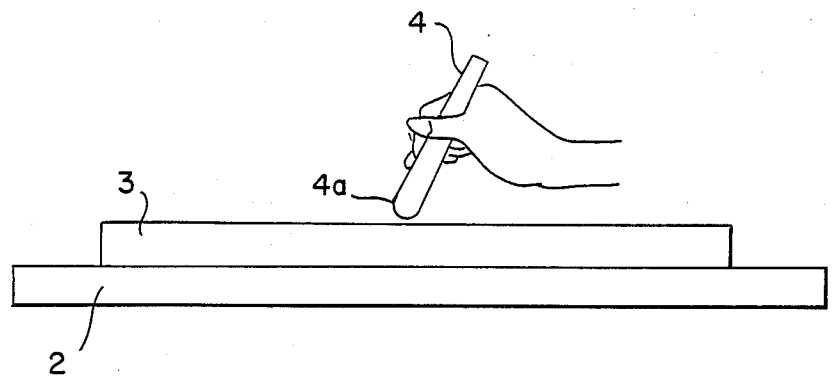
FIG. 2 is the sectional view representing manual input.

FIG. 1 is a simplified block diagram of device 1 executing both input and liquid crystal display. FIG. 2 is a sectional view representing manual input. Device 1 is comprised of a flat tablet 2 allowing input of data using a hand-held magnetic stylus and liquid crystal display unit 3 attached onto tablet 2. Input tablet 2 is an electromagnetic tablet with a series of row sensor electrodes L1, L2, . . ., L2n and a series of column sensor electrodes S1, S2, . . ., S2m covering the tablet at specific intervals to provide discrimination of the input pattern. The row sensors and column sensor electrodes are well insulated and are arranged in a qrid pattern. (see FIG. 1).

As seen in FIG. 2 when the operator writes on input area 3 of tablet 2 with magnetic stylus 4. The electromagnetic induced voltage reaches at its peak value at the position where row sensor electrode Li and column sensor electrode Si meets. Row sensor electrodes L1 through L2n and column sensor electrodes S1 through S2m are connected to detector circuit 5 which is able to detect the electromotive force applied to the sensor electrodes, which is generated by the movement of tip 4a of electromagnetic stylus 4 across surface 3. The detector circuit continually tracks the position of tip 4a, while processor circuit CPU stores movement information in screen memory 7.

Display area 8 of liquid display unit 3 is comprised of partial display areas A and B. Partial display area A is connected to a series of common electrodes P1, P2, ... Pn spaced at intervals to cover partial display area A, as shown in FIG. 1. These common electrodes P1 through Pn are connected to common drive circuit 9. Partial display area B is connected in a similar manner to a series of electrodes Pn+1 through P2n spaced at intervals to cover partial display area B, as shown in FIG. 1. These common electrodes Pn+1 through P2n are connected to common drive circuit 10. Display area 8 comprised of partial display areas A and B is connected to a series of segment electrodes Q1, Q2, . . . Q2m spaced at intervals to cover display area 8, and these segment electrodes Q1 through Q2m are connected to segment drive circuits 11 through 13, respectively. Segment drive circuits 11 through 13 are connected to control circuit 6 via line 14, whereas common drive circuits 9 and 10 are connected to the control circuit 6 via switching element 15. Switching element 15 is comprised of linked switches SW1 and SW2.

Switch SW1 is a consolidation of common contact 17 connected to common drive circuit 9 via line 16, fixed contacts 19 and 20 connected to control circuit 6 via line 18, and grounded fixed contact 21. Switch SW2 is a consolidation of common contact 23 connected to common drive circuit 10 via line 22, fixed contact 25 connected to common drive circuit 9 via line 24, grounded fixed contact 26, and fixed contact 27 connected to control circuit 6 via line 18.

Liquid crystal display unit 3 incorporates common electrodes P1 through P2n in a matrix formation and segment electrodes Q1 through Q2m.

Figure 3:
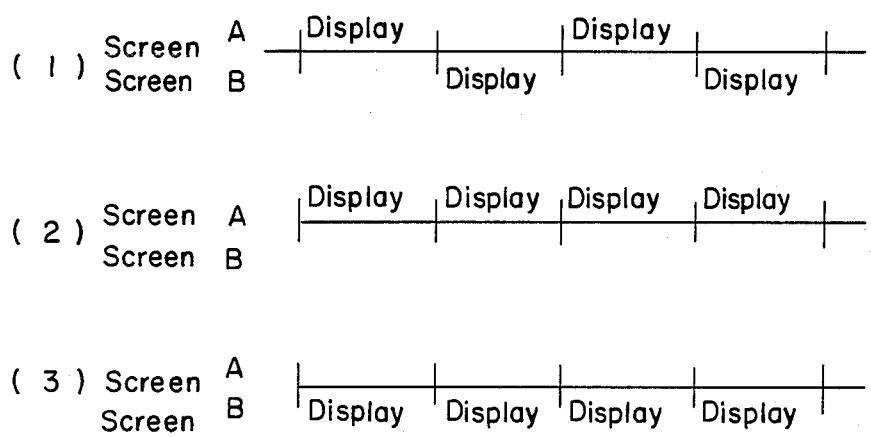
FIG. 3 is a chart showing the display condition of screens A and B.

When ON-voltage is supplied to segment electrodes Q1 through Q2m while any of the common electrodes P1 through P2n is receiving selective voltage, the cross points of segment electrodes Q1 through Q2m and common electrodes P1 through P2n become opaque thus allowing display. As a result, ON or OFF data is selectively transmitted to segment drive circuits 11 through 13 via control circuit 6. For example, when ON-voltage is selectively supplied to segment electrode Qi while common electrode Pj is receiving selective voltage, dot position R (i,j) of partial display area A becomes opaque, thus allowing display. When fully displaying area 8 of liquid crystal display unit 3, common contact 17 and fixed contact 19 of switch SW1 of switching element 15 are connected. At the same time, common contact 23 of switch SW2 is connected to fixed contact 25. Simultaneously, selective voltage is sequentially supplied to each of the common electrodes P1 through P2n of partial display areas A and B via control circuit 6. As a result, common data from common drive circuit 9 is shifted to common drive circuit 10, after which data is displayed on entire display area as shown in FIG. 3 (1). Assuming that the period needed for scanning common electrodes P1 through P2n is T, the time needed to apply selective voltage to each of the common electrodes P1 through P2n is T/2n, indicating ½n of a relatively small duty cycle ratio. Consequently, when a display operation covers both partial display areas A and B, the duty cycle ratio is low, thus degrading the contrast. If the operator inputs data manually under poor contrast conditions and then displays the input pattern in display area 8 of liquid crystal display unit 3, the input pattern would show the very same poor contrast, making it difficult for the operator to adequately follow up the input operation. To compensate for this, assume that only partial display area A is designated for display and the manually-written data is input to partial display area A. First, common contact 17 and fixed contact 20 of switch SW1 of the switching element 15 are connected through control circuit 6. Common contact 23 and fixed contact 26 of switch SW2 are also connected simultaneously. As a result, selective voltage is supplied to respective common electrodes P1 through Pn of partial display area A during scan period T. Assume that when T (frame period) is constant, the period of the selective-voltage supplied to respective common electrodes P1 through Pn is T/n, indicating 1/n of a relatively large duty cycle ratio. As a result, the picture in partial display area A shows improved contrast. Since line 22 of common drive circuit 10 is grounded via common contact 23 and fixed contact 26 of switch SW2 when the input pattern is displayed in partial display area A, as shown in FIG. 3(2), the common electro-waveform is constantly non-selective. Simply, there is no display in partial display area B; only partial display area A is activated. No selective voltage is supplied to common electrodes Pn+1 through P2n of partial display area B, which effectively deactivates area B.

Conversely, when activating partial display area B in order to input data in area B, common contact 17 of switch SW1 of switching element 15 is connected to fixed contact 21, while common contact 23 of switch SW2 is connected to fixed contact 27. Simultaneously, common data is transmitted to common drive circuit 10 so that selective voltage can be distributed to common electrodes Pn+1 through P2n. As in the case of display in partial display area A, when display in partial display area B is performed within period T, the period of selective voltage supplied to respective common electrodes Pn+1 through P2n of the partial display area B is then denoted in terms of T/n, indicating 1/n of the relatively large duty cycle ratio. This operation also improves contrast in partial display area B. When displaying input in partial display area B, no display occurs in partial display area A, as shown in FIG. 3(3): display area A remains inactivated.

Figure 4:
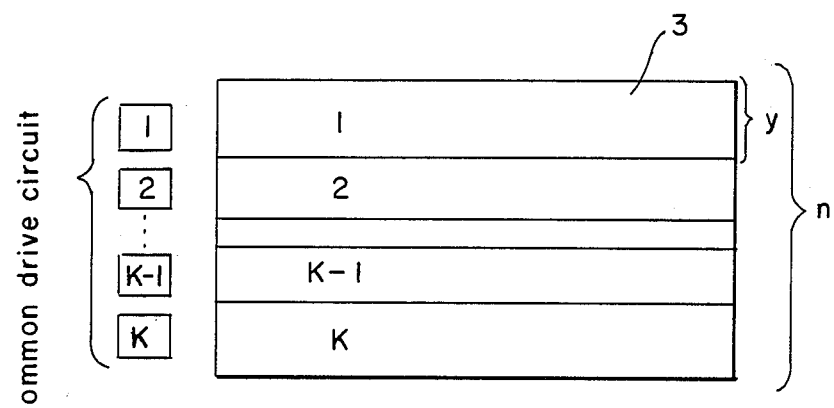
FIG. 4 is a chart representing a condition of display area 8 of liquid crystal display unit 3.

Display area 8 of the liquid crystal display unit 3 shown in FIG. 1 is typically divided into partial display areas A and B. However, as shown in FIG. 4, all display area 8 can be divided into K units of partial display areas, each being provided with K units of common drive circuits having Y units of output terminals. By arranging the system in this way, the entire screen surface can be displayed by using a 1/n duty cycle ratio, and yet, one of the K units of minimal pictures can be displayed by using 1/Y duty cycle radio.

As shown in FIG. 5, control circuit 6 incorporates duty cycle setting register R1 and display start position address register R2. FIG. 6 denotes screen memory 7, in which A1 is the foremost address of the display data in partial display area A, and A2 is the foremost address for display data in partial display area B. When writing on either partial display area A or B using magnetic stylus 4, duty cycle ratio 1/n is set to the duty setting register R1 and either A1 or A2 is set to the display start position address register R2. Thus, to display data on the entire screen, duty cycle ratio ½n is set to the duty register R1, and the foremost address A1 of the display data is input to the display start position address register R2. When displaying data on screen A, n→R1 and A1→R2 are activated, whereas n→R1 and A2→R2 are activated for displaying data on screen B by operating switches SW1 and SW2, respectively. When the display duty cycle varies, the optimum bias ratio varies in turn. Although display can be performed without strictly applying an optimum bias, an optimum bias can be generated merely by varying the resistance value with operating switch SW3 shown in FIG. 7. Variable resistor R' is provided to compensate for the ON-voltage of liquid crystal display unit 3, since duty 1/n causes this voltage to rise compared to duty ½n. Referring now to FIG. 8, assume that common drive circuit 9 of liquid crystal display unit 3 is selectively driven on an 8-dot unit basis. When magnetic stylus 4 comes into contact with the upper surface of display area 8 of liquid crystal display unit 3, tablet 2 provided below liquid crystal display unit 3 senses the magnetism generated by stylus 4, thus allowing the system to display segment "e" in contact with stylus 4, in addition to segments "a" through "d" located in advance of "e" and segments "f" through "i" behind "e". Simultaneously, the 1/72nd duty drive operation is activated. The operator may then manually write data with stylus 4 within a range of segments "a" through "i" at the 1/72nd duty. As stylus 4 moves, each frame also moves sequentially. For example, when stylus 4 moves from segment "e" to segment "f," segments "b" through "j" are displayed. Full screen display is available with the provision of an optional full-screen display switch. This display system may also be devised to allow continuous display of the input pattern for a specific period of time after stylus 4 is raised from the surface 3; once the time has passed, a full-screen display can be automatically activated.

According to the preferred embodiments of the present invention, input pattern data is driven by a high-duty cycle ratio in the selected partial display area of the liquid crystal display unit so that the remaining partial display area cannot be activated. Thus the contrast of the display can be improved in the designated display area where the manual input of data is performed. The resulting clarity reduces the burden incurred by the operator from conventionally insufficient contrast, an improvement which ensures continued efficient and smooth input. In summary, the preferred embodiment of the present invention provides the following advantages.

(1) A unique configuration in which input tablet 2 and the liquid crystal display unit 3 are integrated into one device. Full-screen display can be activated when viewing the display content. When manually inputting data, sharper contrast can be achieved by lowering the duty ratio for the designated data input area, denying illumination to the non-designated area. These features provide the operator with easier handwritten data input, increasing efficiency.

(2) This unique configuration also allows a division of the screen into high duty-cycle segments by providing switching element 15 to ensure that only the needed display area is illuminated. These features greatly enhance the contrast of the designated part of the display screen, eliminating the conventional problems of dull contrast and operator concern about the manual input operation.

(3) To achieve an optimum bias during high-duty cyle operation, resistors are provided between the common drive circuits allowing switches to adjust the bias to an optimum level throughout the display operation.

As is clear from the foregoing detailed description, the preferred embodiment of the present invention integrally provides the liquid display unit directly above a flat tablet where data can be written manually using a magnetic stylus. This liquid crystal display unit is provided with a plurality of divisible display areas. The operator can input data into the tablet of said partial display area through the liquid crystal display unit. The configuration embodied in the present invention allows display of the pattern input on the partial display area of the liquid crystal display unit at a high-duty cycle ratio, thus reducing the burden of the operator and ensuring the smooth and efficient execution of input and display operations. While only certain embodiments of the present invention have been described, it will be apparent to those skilled in the art that various changes and modifications may be made therein without departing from the spirit and scope of the present invention as claimed.

What is claimed is:

1. A system for introducing and displaying information comprising:
   a flat panel matrix display unit having a plurality of pixels arranged in a matrix, each of said pixels associated with one of a plurality of common row electrodes, N;
   input means for introducing the information into the system;
   said input means including a plurality of information receiving elements each corresponding to an individual pixel of said flat panel matrix display;
   said input means detecting a portion of said flat panel matrix display unit being inputted upon;
   common drive means, responsive to said input means, for sequentially scanning said common row electrodes of said matrix display unit with scan voltage pulses;
   said common row electrodes being divided into K common row electrode groups each having N/K common row electrodes and defining a display portion,
   said common drive means sequentially scanning said common row electrodes of at least one of said common row electrode groups to display the information introduced by said input means thereon;
   said common drive means driving said common row electrodes of said portion detected by said input means with a common electrode scan voltage pulse which has a higher duty cycle than the duty cycle 1/N needed to scan all N common row electrodes to improve contrast of the displayed information, thereby operating the system in a partial display mode; and
   said common drive means driving said common row electrodes with a common electrode scan voltage pulse which has a duty cycle of 1/N when the system is operable in a fully display mode.

2. The system of claim 1 wherein said display unit is a liquid crystal display.

3. The system of claim 1 wherein said input means is positioned adjacent to said display unit so that each said pixel of said display unit is juxtaposed to its corresponding said information receiving element.

4. The system of claim 3 wherein said input means includes a magnetic flat tablet positioned under said flat panel matrix display unit.

5. The system of claim 3 wherein said input means includes detector means for detecting said portion receiving information via said input means.

6. The system of claim 5 further comprising means for enabling said common drive means to drive only selected ones of said common row electrode groups adjacent said portion detected by said detector means.

7. The system of claim 1 wherein K is 2.

8. The system of claim 1 wherein the duty cycle is K/(aN) wherein a is the number of common row electrode groups being scanned by said common drive means.

9. The system of claim 1 wherein said common drive means includes a sequential pulse source having an adjustable duty cycle.

10. The system of claim 9 wherein said common drive means includes means for adjusting the voltage supplied to said common row electrodes to compensate for variations in the duty cycle applied by said common drive means.

* * * * *